US012753722B2

(12) United States Patent
Lear

(10) Patent No.: US 12,753,722 B2
(45) Date of Patent: Oct. 6, 2026

(54) DILUTE COMBUSTION OF HYDROGEN IN RETROFITTED GAS TURBINE ENGINES

(71) Applicant: University of Florida Research Foundation, Inc., Gainesville, FL (US)

(72) Inventor: William E. Lear, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 0 days.

(21) Appl. No.: 19/117,477

(22) PCT Filed: Jan. 4, 2024

(86) PCT No.: PCT/US2024/010238
§ 371 (c)(1),
(2) Date: Apr. 1, 2025

(87) PCT Pub. No.: WO2024/172924
PCT Pub. Date: Aug. 22, 2024

(65) Prior Publication Data

US 2026/0126009 A1 May 7, 2026

Related U.S. Application Data

(60) Provisional application No. 63/478,556, filed on Jan. 5, 2023.

(51) Int. Cl.
*F02C 7/141* (2006.01)
*F02C 3/22* (2006.01)
(Continued)

(52) U.S. Cl.
CPC ................ *F02C 7/141* (2013.01); *F02C 3/22* (2013.01); *F02C 3/34* (2013.01); *F02C 7/185* (2013.01); *F05D 2260/213* (2013.01)

(58) Field of Classification Search
CPC .... F02C 7/141; F02C 3/22; F02C 3/34; F02C 7/185; F05D 2260/213
See application file for complete search history.

(56) References Cited

U.S. PATENT DOCUMENTS

| | | | | |
|---|---|---|---|---|
| 6,212,871 | B1 | 4/2001 | Rakhailov | |
| 6,622,470 | B2 * | 9/2003 | Viteri | F02C 6/18 60/39.52 |

(Continued)

FOREIGN PATENT DOCUMENTS

| | | | |
|---|---|---|---|
| WO | 2011110554 | A1 | 9/2011 |

OTHER PUBLICATIONS

International Search Report for PCT/US2024/010238.
(Continued)

*Primary Examiner* — Jesse S Bogue
(74) *Attorney, Agent, or Firm* — Thomas Horstemeyer LLP.

(57) ABSTRACT

Various embodiments are provided related to improved gas turbine engine systems. In one example, a system is provided which includes a gas turbine engine having an air inlet stream, a hydrogen fuel supply, and an exhaust stream. The system further includes a heat exchanger configured to cool the exhaust stream from the gas turbine engine. The system can additionally include a recirculation pathway configured to mix the cooled exhaust stream from the heat exchanger with the air inlet stream.

6 Claims, 5 Drawing Sheets

(51) Int. Cl.
*F02C 3/34* (2006.01)
*F02C 7/18* (2006.01)

(56) References Cited

U.S. PATENT DOCUMENTS

| | | | | |
|---|---|---|---|---|
| 7,503,178 | B2 * | 3/2009 | Bucker | F02C 6/18 60/774 |
| 8,286,431 | B2 * | 10/2012 | Briesch | F01K 23/10 60/39.182 |
| 8,739,560 | B2 * | 6/2014 | Wang | F25B 15/02 62/476 |
| 9,163,561 | B2 * | 10/2015 | Anand | F02C 3/30 |
| 9,500,127 | B2 * | 11/2016 | Rofka | F01K 23/10 |
| 10,247,408 | B2 * | 4/2019 | Lear, Jr. | F22B 1/1815 |
| 12,098,645 | B2 * | 9/2024 | Terwilliger | F01D 15/10 |
| 2008/0010967 | A1 * | 1/2008 | Griffin | B01D 53/22 60/39.182 |
| 2011/0138766 | A1 * | 6/2011 | ELKady | F02C 3/30 60/39.24 |
| 2021/0348561 | A1 | 11/2021 | Cocks et al. | |

OTHER PUBLICATIONS

Ditaranto et al. Concept of hydrogen fired gas turbine cycle with exhaust gas recirculatio n: Assessment of process pe1fonnance. Energy, 192. Nov. 30, 2019. [Retrieved on Aug. 5, 2024]. Retrieved from the internet: <URl,: https://doi.org/10.1016/j.ener gy.2019. 116646> entire document.

* cited by examiner

DILUTE COMBUSTION OF HYDROGEN IN RETROFITTED GAS TURBINE ENGINES

CROSS-REFERENCE TO RELATED APPLICATIONS

This application is the 35 U.S.C. § 371 national stage application of PCT Application No. PCT/US2024/010238, filed Jan. 4, 2024, which claims priority to band the benefit of U.S. provisional application entitled "DILUTE COMBUSTION OF HYDROGEN IN RETROFITTED GAS TURBINE ENGINES" having Ser. No. 63/478,556, filed on Jan. 5, 2023, which is hereby incorporated by reference in its entirety.

BACKGROUND

Combustion turbines can be used to generate mechanical power and/or electricity. To this end, a combustion turbine can ignite a mixture of fuel and air in order to drive a turbine shaft. A byproduct of the combustion can be the production of heat, water, and harmful pollutants such as nitric oxide and nitrogen dioxide (collectively, $NO_x$). $NO_x$ gases are generated from combustion of fuels when nitrogen and oxygen react. The production of $NO_x$ increases at higher temperatures. If hydrocarbon resources are used to fuel the combustion, carbon dioxide will also be produced. Carbon dioxide contributes to the greenhouse effect, and as a result, climate change. The production of $NO_x$ and carbon dioxide are of significant environmental concern.

SUMMARY

Aspects of the present disclosure are related to retrofitting gas turbine engine systems to use hydrogen fuel without producing additional harmful nitrogen oxides ($NO_x$) gases and without costly modification to existing systems. In one aspect, among others, a system comprises a gas turbine engine having an air inlet stream, a hydrogen fuel supply, and an exhaust stream; a heat exchanger configured to cool the exhaust stream from the gas turbine engine; and a recirculation pathway configured to mix the cooled exhaust stream from the heat exchanger with the air inlet stream. The system further comprises a heat recovery unit positioned between the gas turbine engine and the heat exchanger, where the heat recovery unit is configured to at least: receive the exhaust stream of the gas turbine engine; cool the exhaust stream; and output the cooled exhaust stream to the heat exchanger. The system further comprises a cooler positioned between the heat exchanger and the air inlet stream, where the cooler is configured to further cool air exiting the heat exchanger before mixing the cooled exhaust stream with the air inlet stream. In some aspects, the cooler outputs water as a by-product of cooling.

In one or more aspects, the system further comprises a chiller configured to cool an exiting air stream from the heat exchanger to generate a cool air stream and configured to return the cool air stream to the air inlet stream. The chiller returns cool air to the cooler for further cooling in some aspects. The chiller can comprise at least one of an adsorption chiller or an absorption chiller.

In another aspect, a method comprises diluting an air inlet stream for a gas turbine engine with an exhaust gas recirculation stream; providing a hydrogen fuel supply to the gas turbine engine; combusting the air inlet stream and hydrogen fuel supply to produce energy and an exhaust stream; and cooling the exhaust stream with a heat exchanger to produce the gas recirculation stream. In some aspects, the hydrogen fuel supply is pure hydrogen. In other aspects, the hydrogen fuel supply is 50 to 100% hydrogen. Cooling the exhaust stream can further comprise using a heat recovery unit to remove heat from the exhaust stream of the gas turbine engine; and directing the cooled exhaust stream to the heat exchanger for further cooling. According to various embodiments, cooling the exhaust stream further comprises using a chiller to cool an output from the heat exchanger; and adding the cooled output to the gas recirculation stream. In some aspects, cooling the exhaust stream further comprises: using a cooler to cool an output from the heat exchanger; and adding the cooled output to the gas recirculation stream. In some aspects, cooling the exhaust stream further comprises: using a chiller to cool a first output from the heat exchanger; using a cooler to cool a second output from the heat exchanger; and adding the first cooled output and the second cooled output to the gas recirculation stream.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
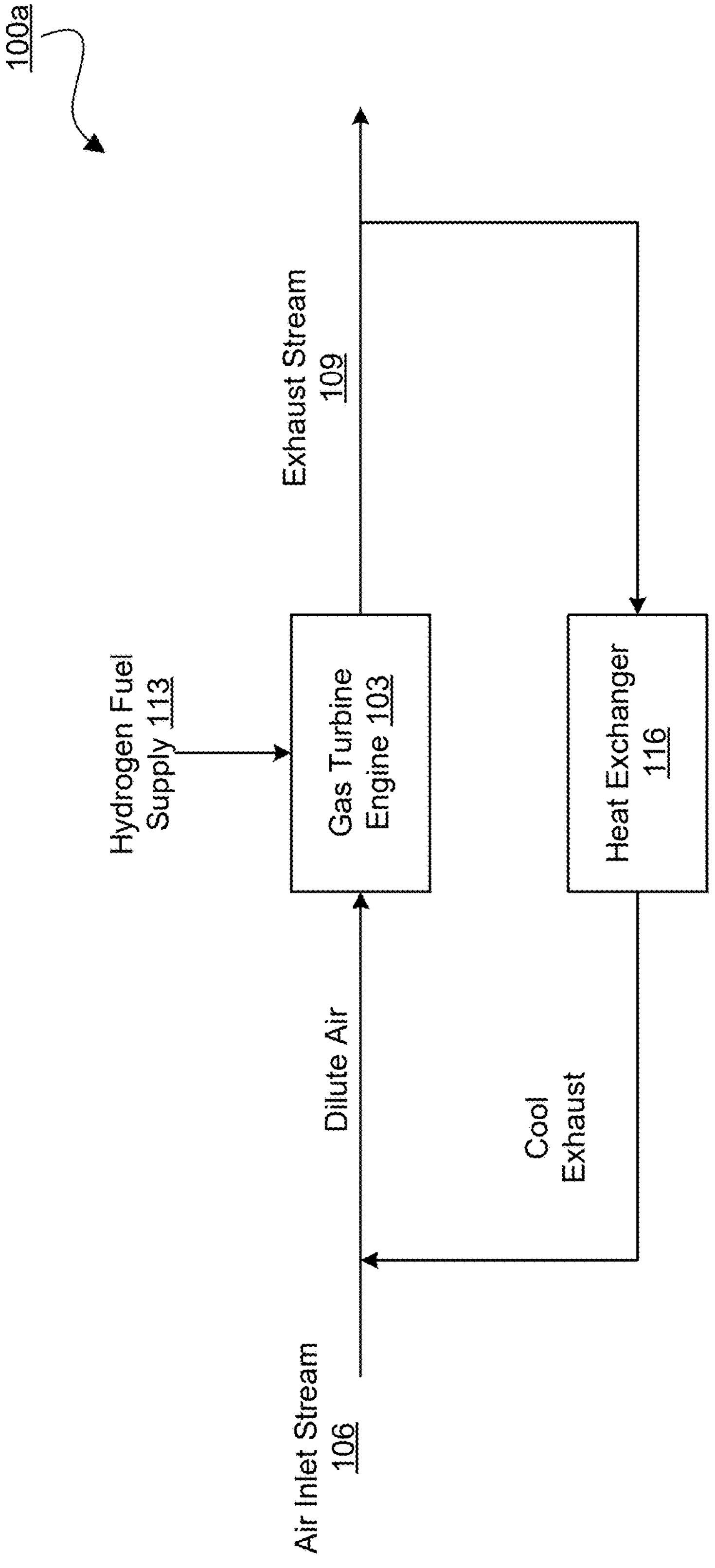
FIG. 1 is a diagram of an example gas turbine engine system according to various embodiments of the present disclosure.

The embodiments of the present disclosure are directed towards retrofitting gas turbine engine systems to use hydrogen fuel without producing additional harmful nitrogen oxides ($NO_x$) gases and without significant modification to existing systems. In some embodiments, the retrofit can be accomplished using only the addition of a heat exchanger and ducting for exhaust gas recirculation.

Hydrogen utilization in gas turbine engines is an intense focus in the industry, with efforts under way by essentially every original equipment manufacturer of terrestrial gas turbines in the world. The motivation is aimed at meeting government mandates driven by decarbonization goals. Hydrogen can be produced from non-carbon primary energy sources such as solar or wind energy, and it does not produce carbon products when combusted; hence, hydrogen can be a carbon-free energy carrier and storage medium. Hydrogen may also be burned in gas turbine engines in integrated gasification combined cycle (IGCC) plants or the various semi-closed cycle concepts. However, when reacted with undiluted air, hydrogen's adiabatic flame temperature is nearly 500° F. hotter than the adiabatic flame temperature of natural gas.

Although the industry has made progress in allowing increased percentages of hydrogen in fuel blends, the use of 100% hydrogen in practical, flexible systems remains elusive, preventing the achievement of zero carbon generation. There are engineering problems associated with pure hydrogen fuel, such as materials compatibility and higher combustion temperatures, but the primary problem is the generation of harmful nitrous oxides ($NO_x$). The production of $NO_x$ gases increases as combustion temperatures increase through a kinetic pathway where nitrogen is oxidized by oxygen at high temperatures. This is known as the thermal $NO_x$ mechanism. Because hydrogen reacting with pure air causes excessively high local temperatures, $NO_x$ is created rapidly, unless premixing or dilution are employed. Premixing is problematic due to the potential for flashback into the mixing region, which generates $NO_x$ and may damage equipment. Dilution can require a diluent gas such as steam or nitrogen, placing a burden on the system, increasing costs, and generally decreasing plant efficiency.

Dilution of the firing air by exhaust gas recirculation (EGR) has been shown to be an effective way to limit $NO_x$ in hydrogen fueled gas turbine combustors. The EGR stream is inherently available only in semi-closed cycle gas turbines. This disclosure deals with a method of retrofitting existing gas turbine plants (conventional non-semi-closed cycle systems) to allow EGR, hence enabling the use of up to 100% hydrogen fuel.

In some embodiments, the approach can include modifying the ductwork and piping external to the engine to capture a large fraction of the exhaust gas (e.g., typically ⅔ to ¾ of the flow), pass it through a duct or pipe to one or more heat exchangers for cooling, then mix the cooled exhaust gas with fresh air before it enters the engine. One feature of this approach can include using the existing combustion system, thus simplifying the retrofit process greatly. Only the fuel delivery system providing hydrogen would need to be changed, not the internal components of the engine.

Low $NO_x$ combustion systems in terrestrial gas turbine engines are mostly of the lean premixed design. Undiluted air is mixed with fuel (most commonly natural gas) without reacting, resulting in a lean fuel-air mixture with a lower adiabatic flame temperature than a stoichiometric mixture would produce. Preventing the reaction until after this mixing process is complete decreases the maximum local temperature in the reaction zone, hence reduces $NO_x$. Such combustor designs include multiple modes to allow operation at part power without unacceptable $NO_x$ generation, always avoiding flashback into the beginning portion of the mixing region.

The current disclosure is to utilize EGR as described above, so that the air approaching the combustor is dilute. Simultaneously using hydrogen fuel, replacing the natural gas or other conventional fuel for which the combustor was designed, would allow the existing low $NO_x$ hardware to operate as a diffusion burner. Diffusion burners are a legacy approach in which fuel and air are continuously supplied to a reaction zone. Since there is no premixing, conventional pure-air diffusion burners produce unacceptable $NO_x$ levels. However, with dilute air, even hydrogen would not produce hot regions significantly hotter than the average turbine inlet temperature. The lack of hot spots would not only suppress $NO_x$ formation dramatically, but would also avoid damaging the hardware.

To summarize, existing gas turbine engines can be retrofitted to operate on pure hydrogen without exceeding regulated $NO_x$ limits and without significant modifications to the gas turbine engine. In addition, these retrofitted gas turbine engines could be operated using a hydrogen blend having hydrogen concentrations ranging from 50-100%. The existing gas turbine engine system comprises an air inlet stream and a fuel supply to a gas turbine engine and an exhaust stream exiting the engine. The additional hardware to accomplish a hydrogen fuel and EGR retrofit is far less expensive than developing a new engine with a specialized combustion system designed for hydrogen. The approach may be applied to a wide range of gas turbine engine sizes and combustor designs, as the $NO_x$ suppression is a fundamental consequence of the reduced temperature due to dilution, not dependent upon the particulars of the combustor design.

In some embodiments, the EGR stream can include a duct or pipe and heat exchanger(s) to provide cool diluent gas to the inlet, to mix with inlet air. The duct and heat exchangers offer additional potential benefits since heat is removed from the EGR stream. That heat may be 1) rejected to ambient, 2) supplied to a nearby heat load, 3) supplied to a heat-activated cooling system (such as absorption or adsorption chillers) to produce cooling which could be applied to the EGR stream, lowering the engine inlet temperature. The engine efficiency is quite sensitive to inlet temperature, so option 3) would also increase efficiency.

It should also be possible to change fuels back and forth. Once the EGR duct is in place and $H_2$ is supplied, the engine can operate in hydrogen mode. Additionally, a damper or other movable surface can be added to change the flow path from the exhaust duct to the EGR pathway. Removing portions of the EGR duct, or closing off the EGR pathway, and supplying the gas turbine engine with natural gas again instead of hydrogen would return the engine to its original design state.

With respect to FIG. 1, shown is a diagram of an example gas turbine engine system 100 in accordance with various embodiments of the present disclosure. The gas turbine engine system **100*a* can include a gas turbine engine 103 having an air inlet stream 106 and an exhaust stream 109. The gas turbine engine 103 can be part of an existing system and retrofitted to have a hydrogen fuel supply 113 instead of a natural gas fuel supply. In some embodiments, the hydrogen fuel supply 113 may require specialized fuel injectors capable of operation without lubrication and resistant to embrittlement, such as low-pressure direct injectors. In some embodiments, the hydrogen fuel supply 113** can be pure hydrogen. In some embodiments, the hydrogen fuel supply is highly concentrated hydrogen (50-100% hydrogen).

In some embodiments, the air inlet stream 106 can comprise dilute air. In some embodiments, the air inlet stream 106 can be diluted using cooled air from the exhaust stream 109. The likely temperature range for cooled air in the exhaust stream would be 20 to 100° C. As shown in FIG. 1, at least a portion of the exhaust stream 109 can be directed to a heat exchanger 116 using piping, conduit, ductwork, and/or other components. The heat exchanger 116 can be a shell and tube, double pipe, plate, condenser, evaporator/boiler, air or fan cooled, adiabatic wheel, compact or any other type of heat exchanger as can be appreciated. In some embodiments, the heat exchanger 116 can be used to generate steam and provide heat to a heat load. The heat exchanger 116 can cool the portion of the exhaust stream 109 and produce cool exhaust. The cool exhaust can then be directed back to the air inlet stream 106 using piping, conduit, ductwork, and/or other components, to dilute the air inlet stream 106. By using cooled exhaust, the temperature and oxygen content of the air inlet stream 106 are decreased.

Figure 2:
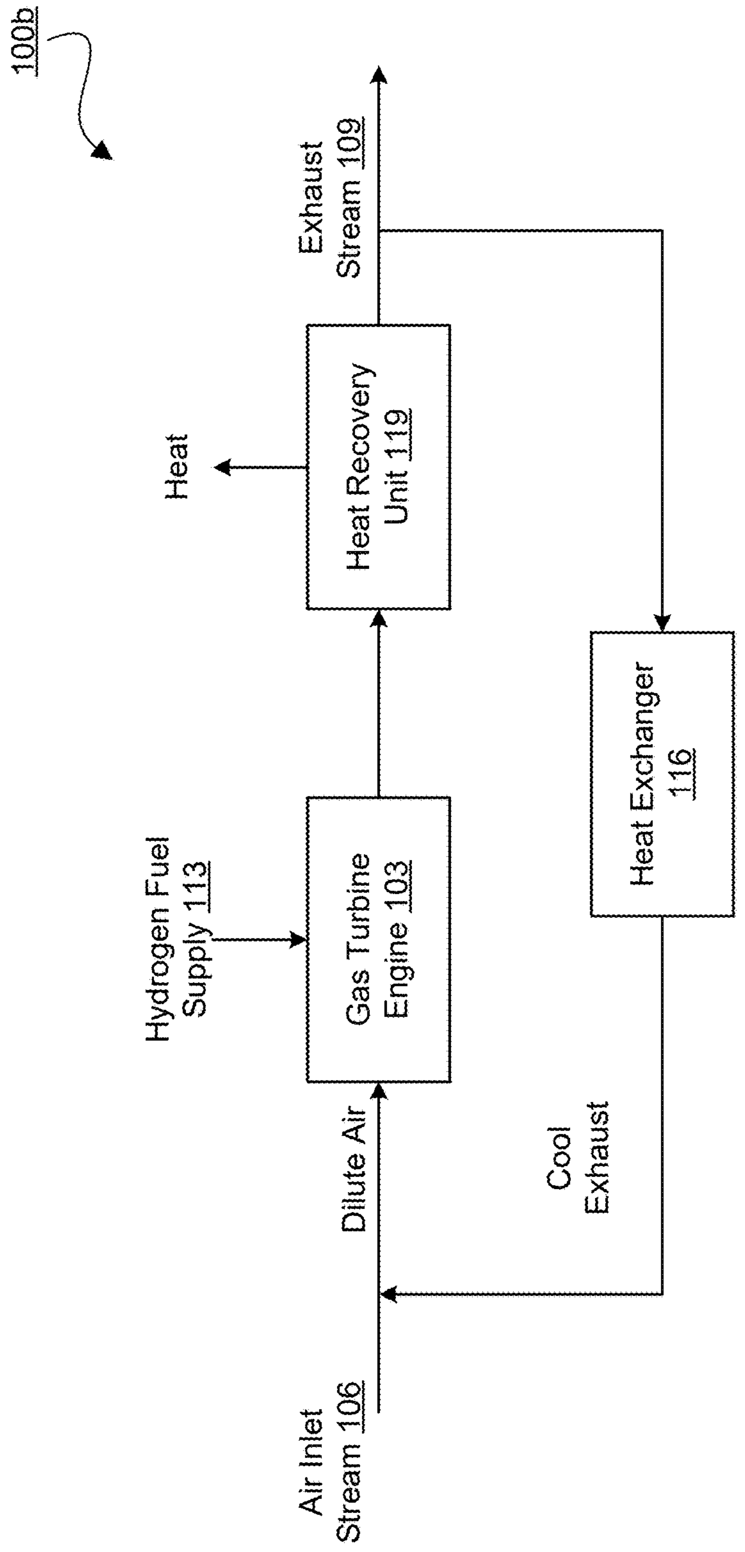
FIG. 2 is a diagram of an example gas turbine engine system according to various embodiments of the present disclosure.

In FIG. 2, shown is a diagram of an example gas turbine engine system 100*b* according to various embodiments of the present disclosure. In some embodiments, in addition to the elements described in the discussion of FIG. 1, the gas turbine engine system 100*b* can include a heat recovery unit 119. In some embodiments, the heat recovery unit 119 can be part of the existing gas turbine engine system 100, and the exhaust gas recirculation pathway can be added after the exhaust stream 109 exits the heat recovery unit 119. The heat recovery unit 119 can be a heat recovery steam generator, heat pipe exchanger, thermal wheel, economizer, heat pump, run around coil, or other type of heat recovery unit. The heat recovery unit 119 can be configured to serve as an additional cooling step by removing heat from the exhaust stream 109 leaving the gas turbine engine 103 and can transfer the heat to a heat load. The heat load can be a heat recovery steam generator, a system or a part of a system that requires heat, such as a combined heat and power (CHP) system, a district heating system, or other system that utilizes heat. At least a portion of the exhaust stream 109 leaving the heat recovery unit 119 can then be directed through piping, conduit, ductwork, and/or other components to the heat exchanger 116 described in the discussion of FIG. 1.

Figure 3:
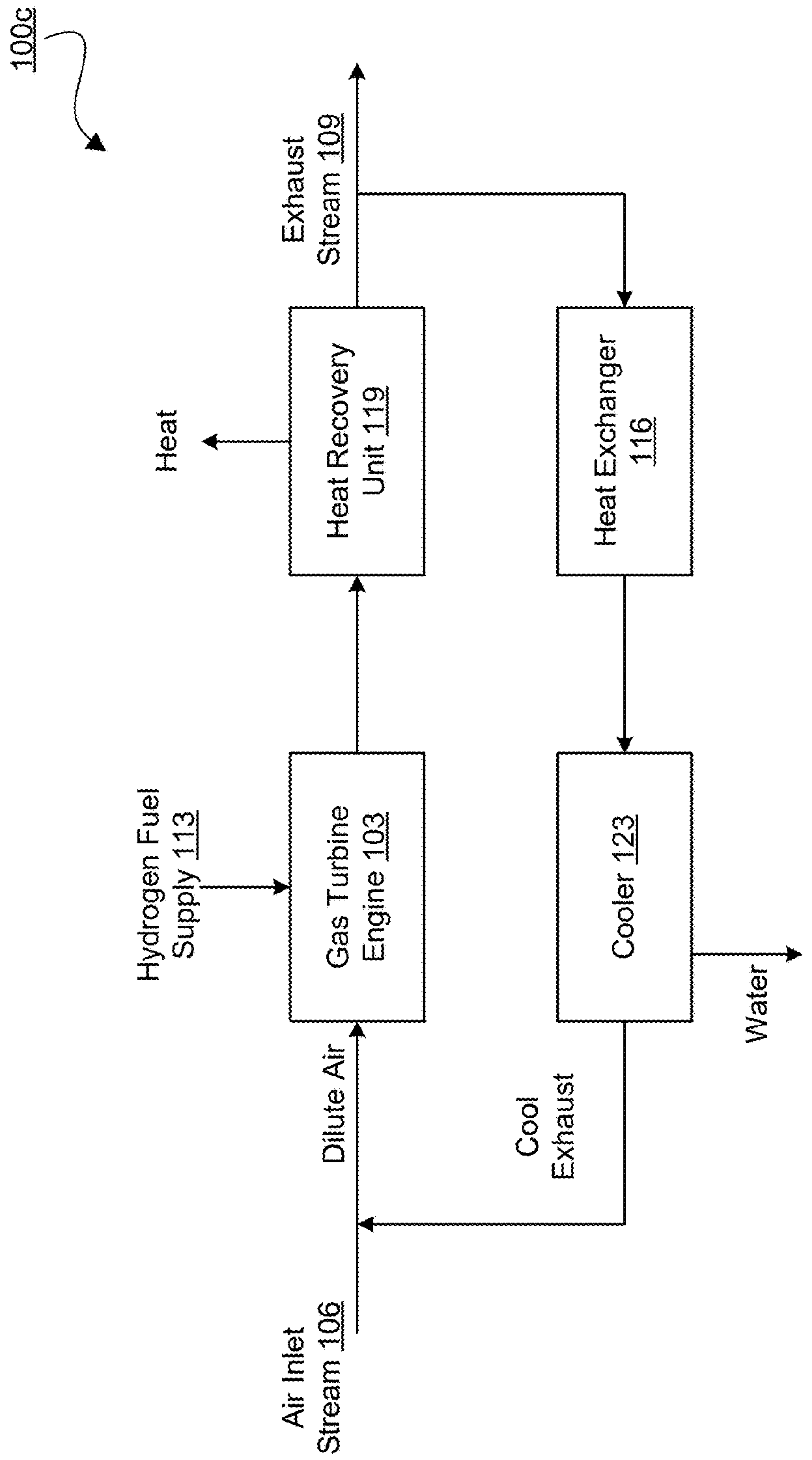
FIG. 3 is a diagram of an example gas turbine engine system according to various embodiments of the present disclosure.

FIG. 3 depicts another diagram of an example gas turbine engine system 100*c* according to various embodiments of the present disclosure. The gas turbine engine system 100*c* can include some or any of the gas turbine engine 103, the heat exchanger 116, and the heat recovery unit 119 discussed in FIGS. 1 and 2, as well as additional components. The gas turbine engine system 100*c* can further comprise a cooler 123 disposed after the heat exchanger 116 such that the cooler 123 receives the cooled gas via piping, conduit, ductwork, and/or other components leaving the heat exchanger 116, and further cools the gas. In some embodiments, the cooler 123 can be positioned just before the gas turbine engine 103 to cool the dilute air inlet stream 106 before it enters the gas turbine engine 103. In some embodiments, there can be multiple coolers 123 throughout the exhaust gas recirculation pathway. The cooler 123 could be any heat exchanger designed to cool a fluid. In some embodiments, the cooler 123 uses coolant which is cooled by a cooling tower, air-to-coolant heat exchanger, an absorption refrigeration system, or any other similar system. While cooling the gas, the cooler 123 may produce water as a by-product which can be recycled and utilized in another process or discarded as waste. The cooled exhaust exiting the cooler 123 can be combined with the air inlet stream 106 of the gas turbine engine 103 through piping, conduit, ductwork, and/or other components. The cooled exhaust exiting the cooler 123 can further reduce the temperature and oxygen content of the air inlet stream 106. The cooler 123 can reduce the temperature of the exhaust to within −20 to 20° C., or colder.

Figure 4:
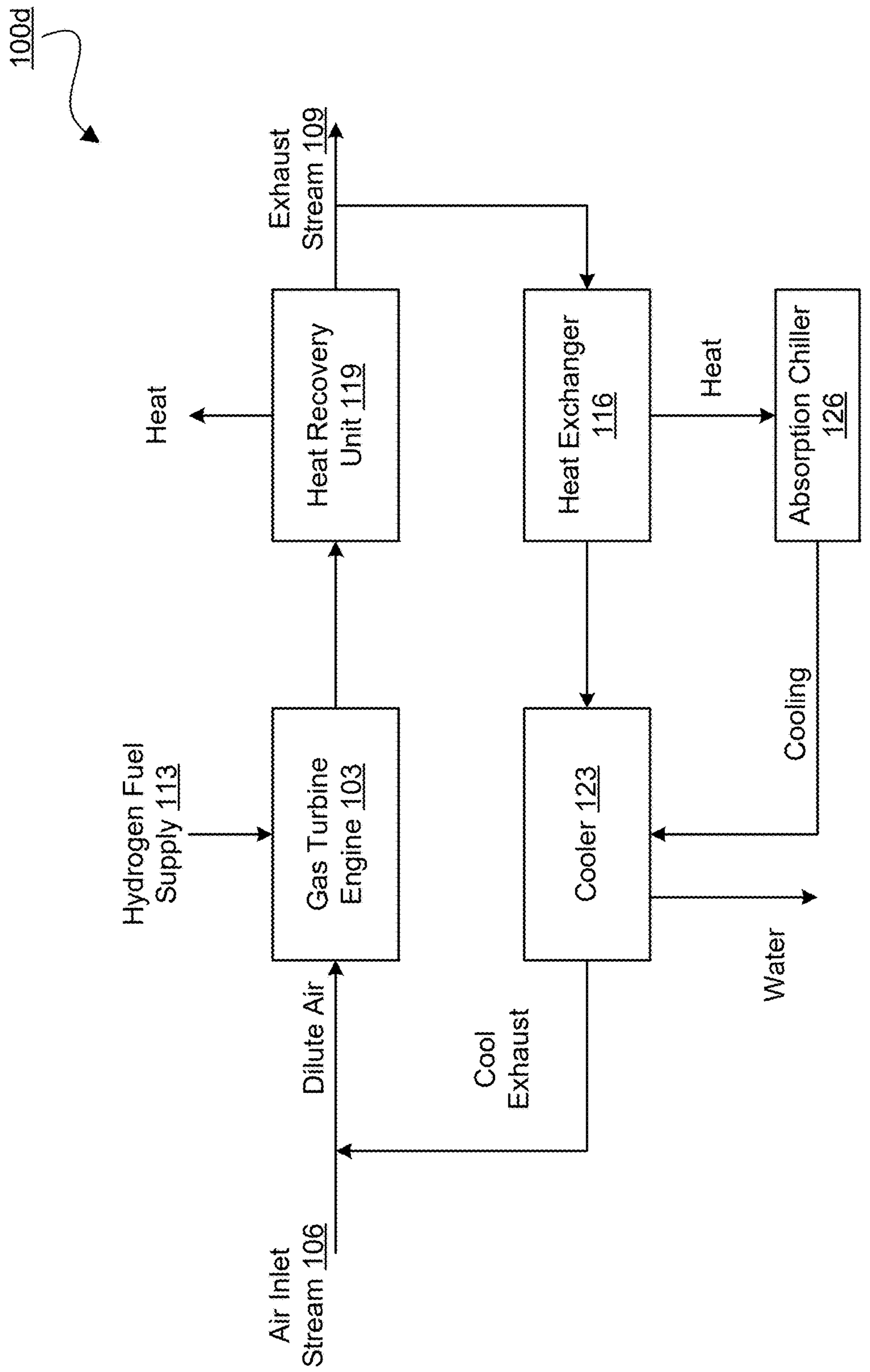
FIG. 4 is a diagram of an example gas turbine engine system according to various embodiments of the present disclosure.

With respect to FIG. 4, shown is a diagram of another example gas turbine engine system 100*d* according to various embodiments of the present disclosure. The gas turbine engine system 100*d* can include some or any of the gas turbine engine 103, the heat exchanger 116, the heat recovery unit 119, and the cooler 123 discussed in FIGS. 1-3, as well as additional components. In some embodiments, the gas turbine engine system 100*d* can further comprise a chiller 126. The chiller 126 can be an absorption or adsorption chiller 126. The chiller 126 can be configured to use waste heat from the heat exchanger 116 to drive a thermodynamic process which in turn can be configured to further cool the exhaust leaving the heat exchanger 116. In some embodiments, the chiller 126 can be configured to provide cooling to the cooler 123.

Next, a general description of the operation of the various components of the gas turbine engine system 100 is provided. Although this general description illustrates the interactions between the components of the gas turbine engine system 100, other interactions or sequences are possible in various embodiments of the present disclosure.

To begin, a gas turbine engine system 100 can be retrofitted to include an exhaust gas recirculation stream configured to dilute an air inlet stream 106 to a gas turbine engine 103. The fuel supply to the gas turbine engine 103 can be replaced with a hydrogen fuel supply 113. The air inlet stream 106 and hydrogen fuel supply 113 can be combusted in the gas turbine engine 103 to produce energy and an exhaust stream 109. The exhaust gas recirculation stream can comprise ductwork, piping, conduit, and/or other components to redirect a portion (e.g., ⅔ to ¾) of the exhaust stream 109 to one or more heat exchangers 116 to cool the exhaust for the recirculation stream. In some embodiments, the exhaust stream 109 can be further cooled using a heat recovery unit 119. In some embodiments, the exhaust stream 109 can be further cooled using an chiller 126. In some embodiments, the exhaust stream 109 can be further cooled using a cooler 123. In some embodiments, the exhaust stream can be cooled using a combination of two or more of the heat exchanger 116, the heat recover unit 119, the cooler 123, and/or the chiller 126. After the exhaust has been cooled, the cooled exhaust can be added to the gas recirculation stream through piping, ductwork, conduit, and/or other components. The gas recirculation stream can be used to simultaneously cool the air inlet stream 106 and dilute the oxygen concentration of the air inlet stream 106, both of which result in lower combustion temperatures to reduce $NO_x$ emissions. The process of the retrofit is further explained in the discussion of FIG. 5.

Figure 5:
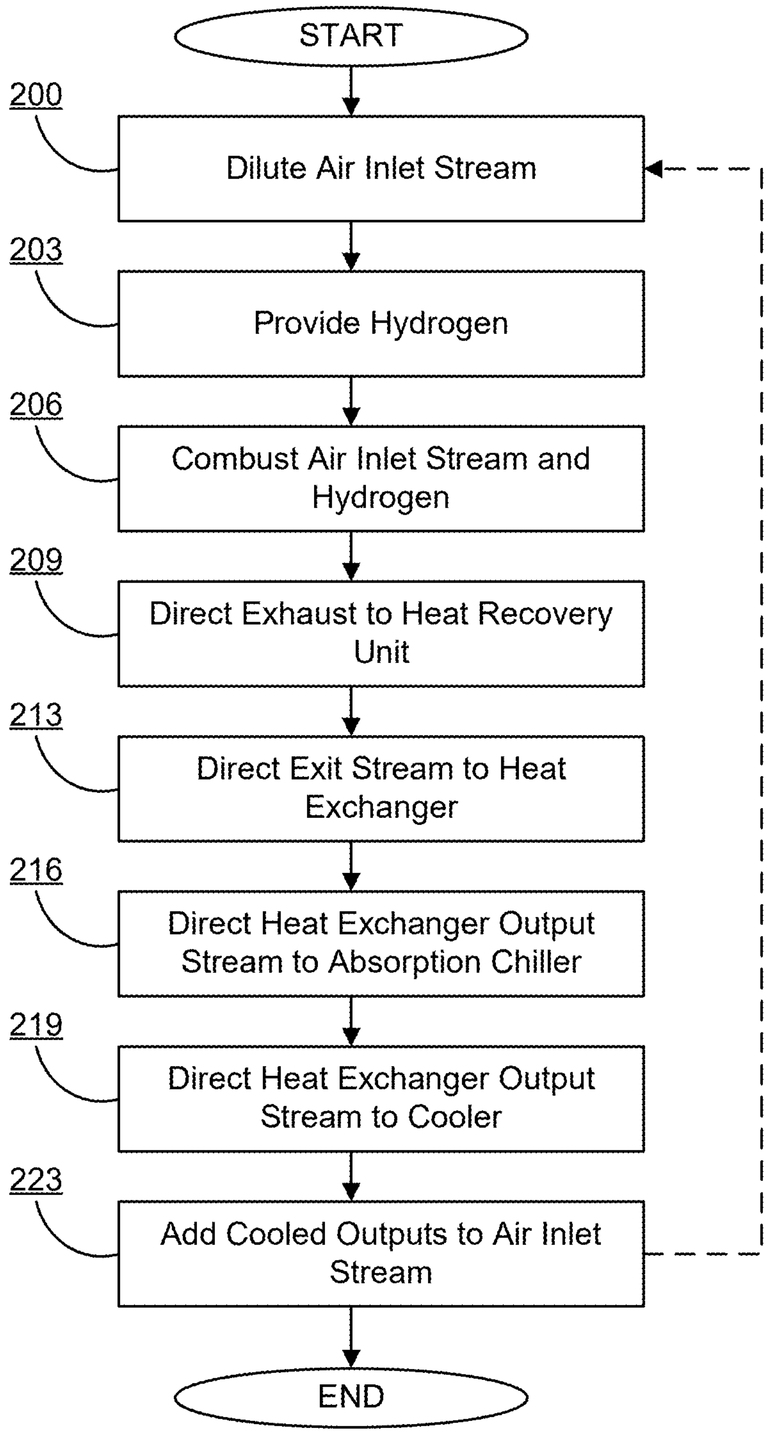
FIG. 5 is a flowchart illustrating one example of functionality of the gas turbine engine system according to various embodiments of the present disclosure.

Referring next FIG. 5, shown is a flowchart that provides an example of the operation of the gas turbine engine system 100. The flowchart of FIG. 5 provides merely an example of the many different types of functional arrangements that can be employed to implement the operation of the depicted portion of the gas turbine engine system 100.

Beginning with block 200, the gas turbine engine system 100 can be retrofit to dilute the air inlet stream 106. The air inlet stream 106 can be diluted with a gas recirculation stream comprised of cooled exhaust. In some embodiments, the cooled exhaust can originate from the exhaust stream 109 exiting the gas turbine engine 103.

At block 203, hydrogen is provided to the gas turbine engine 103. The hydrogen can come from a hydrogen fuel supply 113. The hydrogen fuel supply 113 can be a replacement for a natural gas fuel supply in an existing gas turbine engine system 100.

At block 206, the hydrogen and the air inlet stream 106 are combusted within the gas turbine engine 103. The combustion of the hydrogen and the air inlet stream 106 produces an exhaust stream 109 which exits the gas turbine engine 103.

At block 209, ductwork or other forms of conduit can be used to direct the exhaust stream 109 from the gas turbine engine 103 to a heat recovery unit 119. In some embodiments, the entirety of the exhaust stream 109 can be directed to the heat recovery unit 119. In some embodiments, only a portion of the exhaust stream 109 can be directed to the heat recovery unit 119. In some embodiments, this block 209 can be skipped.

At block 213, ductwork or other forms of conduit can be used to direct the exhaust stream 109 to a heat exchanger 116. In some embodiments, the exhaust stream 109 can enter the heat exchanger 116 directly from the gas turbine engine 103. In some embodiments, the exhaust stream 109 first passes through the heat recovery unit 119, and the resulting exit stream from the heat recovery unit 119 is directed to the heat exchanger 116.

At block 216, ductwork or other forms of conduit can be used to direct the heat output from the heat exchanger 116 to an chiller 126. In some embodiments, a portion of the exhaust stream 109 can be directed to the chiller 126. In some embodiments, the chiller 126 can be used to drive a cooler 123.

At block 219, ductwork or other forms of conduit can be used to direct the exit stream from the heat exchanger 116 to a cooler 123. In some embodiments, the exhaust stream 109 can enter the cooler 123 directly from the gas turbine engine 103. In some embodiments, the exhaust stream 109 first passes through the heat recovery unit 119 and then to the cooler 123.

At block 223, the cooled output streams from the heat recovery unit 119, heat exchanger 116, the chiller 126, and/or the cooler 123 can be added to the air inlet stream 106. In some embodiments, the exhaust stream 109 is circulated through one or more of the heat recovery unit 119, the heat exchanger 116, the chiller 126, and/or the cooler 123 to produce the cooled output streams which are added to the air inlet stream 106. The cooled output streams are used to dilute the air inlet stream 106 as described in the discussion of block 200.

Although the description of the operation of the gas turbine engine system 100 and corresponding figures show a specific order of components, it is understood that the order of components can differ from that which is depicted. Additionally, although the flowcharts show a specific order of execution, it is understood that the order of execution can differ from that which is depicted. For example, the order of two or more components or blocks of a flowchart can be scrambled relative to the order shown. Also, two or more components or blocks shown in succession can be executed concurrently or with partial concurrence. Further, in some embodiments, one or more of the components shown in the figures can be skipped or omitted. It is understood that all such variations are within the scope of the present disclosure.

In addition to the forgoing, the various embodiments of the present disclosure include, but are not limited to, the embodiments set forth in the following clauses.

Clause 1 is a system, comprising a gas turbine engine having an air inlet stream, a hydrogen fuel supply, and an exhaust stream; a heat exchanger configured to cool the exhaust stream from the gas turbine engine; and a recirculation pathway configured to mix the cooled exhaust stream from the heat exchanger with the air inlet stream.

Clause 2 is the system of clause 1, further comprising a heat recovery unit positioned between the gas turbine engine and the heat exchanger, the heat recovery unit configured to at least receive the exhaust stream of the gas turbine engine; cool the exhaust stream; and output the cooled exhaust stream to the heat exchanger.

Clause 3 is the system of any one of clauses 1 or 2, further comprising a cooler positioned between the heat exchanger and the air inlet stream, the cooler configured to further cool air exiting the heat exchanger before mixing the cooled exhaust stream with the air inlet stream.

Clause 4 is the system of 3, wherein the cooler outputs water as a by-product of cooling.

Clause 5 is the system of any one of clauses 3 or 4, further comprising a chiller configured to cool an exiting air stream from the heat exchanger to generate a cool air stream and configured to return the cool air stream to the air inlet stream.

Clause 6 is the system of any one of clauses 3-5, wherein the chiller returns cool air to the cooler for further cooling.

Clause 7 is the system of any one of clauses 3-5, wherein the chiller is at least one of an adsorption chiller or an absorption chiller.

Clause 8 is a method, comprising diluting an air inlet stream for a gas turbine engine with an exhaust gas recirculation stream; providing a hydrogen fuel supply to the gas turbine engine; combusting the air inlet stream and hydrogen fuel supply to produce energy and an exhaust stream; and cooling the exhaust stream with a heat exchanger to produce the gas recirculation stream.

Clause 9 is the method of clause 8, wherein the hydrogen fuel supply is pure hydrogen.

Clause 10 is the method of any one of clauses 8 or 9, wherein the hydrogen fuel supply is 50 to 100% hydrogen.

Clause 11 is the method of any one of clauses 8-10, wherein cooling the exhaust stream further comprises using a heat recovery unit to remove heat from the exhaust stream of the gas turbine engine; and directing the cooled exhaust stream to the heat exchanger for further cooling.

Clause 12 is the method of any one of clauses 8-11, wherein cooling the exhaust stream further comprises using a chiller to cool an output from the heat exchanger; and adding the cooled output to the gas recirculation stream.

Clause 13 is the method of any one of clauses 8-12, wherein cooling the exhaust stream further comprises using a cooler to cool an output from the heat exchanger; and adding the cooled output to the gas recirculation stream.

Clause 14 is the method of any one of clauses 8-13, wherein cooling the exhaust stream further comprises using a chiller to cool a first output from the heat exchanger; using a cooler to cool a second output from the heat exchanger; and adding the first cooled output and the second cooled output to the gas recirculation stream.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a gas turbine engine having an air inlet stream, a hydrogen fuel supply, and an exhaust stream;

a heat recovery unit positioned between the gas turbine engine and a heat exchanger, the heat recovery unit configured to at least:

receive the exhaust stream of the gas turbine engine;

cool the exhaust stream; and output the cooled exhaust stream to the heat exchanger;

the heat exchanger configured to cool the exhaust stream from the gas turbine engine and to produce a first output of air that exits a first outlet of the heat exchanger and a second output of air that exits a second outlet of the heat exchanger;

a chiller configured to cool the first output of air exiting from the first outlet of the heat exchanger, the chiller configured to generate a cool air stream that is directed into a cooler; and the cooler positioned between the heat exchanger and the air inlet stream and between the chiller and the air inlet stream, the cooler in communication with the second outlet of the heat exchanger and the chiller, the cooler configured the cool air stream from the chiller and the second output of air exiting the heat exchanger before mixing the cooled exhaust stream with the air inlet stream.

2. The system of claim 1, wherein the cooler outputs water as a by-product of cooling.

3. The system of claim 1, wherein the chiller is at least one of an adsorption chiller or an absorption chiller.

4. A method, comprising:

diluting an air inlet stream for a gas turbine engine with an exhaust gas recirculation stream;

providing a hydrogen fuel supply to the gas turbine engine;

combusting the air inlet stream and hydrogen fuel supply to produce energy and an exhaust stream; and cooling the exhaust stream with a heat exchanger to produce the gas recirculation stream;

wherein cooling the exhaust stream further comprises:

using a heat recovery unit to remove heat from the exhaust stream of the gas turbine engine, directing the cooled exhaust stream to the heat exchanger for further cooling, wherein the further cooling includes:

using a chiller to cool a first output from the heat exchanger;

using a cooler to cool a second output from the heat exchanger; and adding the first cooled output and the second cooled output to the gas recirculation stream.

5. The method of claim 4, wherein the hydrogen fuel supply is pure hydrogen.

6. The method of claim 4, wherein the hydrogen fuel supply is 50 to 100% hydrogen.

* * * * *